United States Patent
King et al.

(10) Patent No.: US 6,233,866 B1
(45) Date of Patent: May 22, 2001

(54) PLANT ATTACHMENT DEVICE FOR KILLING OBNOXIOUS PLANTS

(75) Inventors: Lloyd Herbert King, Town & Country, MO (US); Stuart S. Cox, Sr., Tallahassee, FL (US)

(73) Assignee: King Technology of Mo. Inc, St. Charles, MO (US)

( * ) Notice: Subject to any disclaimer, the term of this patent is extended or adjusted under 35 U.S.C. 154(b) by 0 days.

(21) Appl. No.: 09/476,048

(22) Filed: Dec. 31, 1999

Related U.S. Application Data

(60) Provisional application No. 60/114,845, filed on Jan. 6, 1999.

(51) Int. Cl.⁷ .................................................. A01C 15/00
(52) U.S. Cl. ............................................................... 47/1.5
(58) Field of Search ................. 47/1.5, 1.7; 119/156, 119/651; 222/95; 424/76.1

(56) References Cited

U.S. PATENT DOCUMENTS

| | | | |
|---|---|---|---|
| 2,841,923 | 7/1958 | Dickson | 47/1.01 R |
| 3,899,100 | 8/1975 | Riguad | 220/229 |
| 4,199,896 | 4/1980 | Lehman | 41/1.7 |
| 4,223,477 | 9/1980 | Abernathy | 47/1.5 |
| 4,328,904 | 5/1982 | Iverson | 220/256 |
| 5,564,224 | * 10/1996 | Carlson et al. | 47/57.6 |
| 5,593,059 | 1/1997 | Neilson | 220/229 |
| 5,676,990 | 10/1997 | Wawrzynski | 426/305 |
| 5,689,913 | * 11/1997 | Beaudry | 47/1.5 |
| 5,873,196 | * 2/1999 | Hoffman et al. | 47/57.5 |
| 5,894,957 | * 4/1999 | Egel | 222/95 |
| 5,932,204 | * 8/1999 | Joshi | 424/76.1 |

* cited by examiner

*Primary Examiner*—Charles T. Jordan
*Assistant Examiner*—Francis T. Palo
(74) *Attorney, Agent, or Firm*—Jacobson & Johnson

(57) ABSTRACT

A plant attachment device and a method for killing obnoxious weeds that includes the step of cutting a stem of an obnoxious weed to leave a cut end extending from the ground to enable a container having an herbicide therein to be placed over the cut end of the stem and members thereon for supporting the herbicide carrier on the cut weed stem to hold the herbicide proximate the cut end to allows the herbicide sufficient time to penetrate into the tissue of the weed to cause the weed to die.

13 Claims, 1 Drawing Sheet

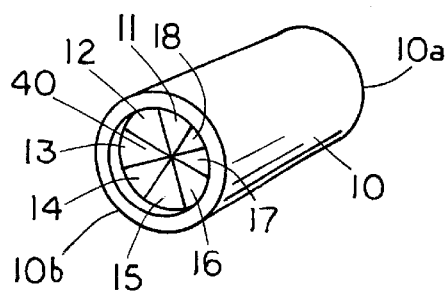
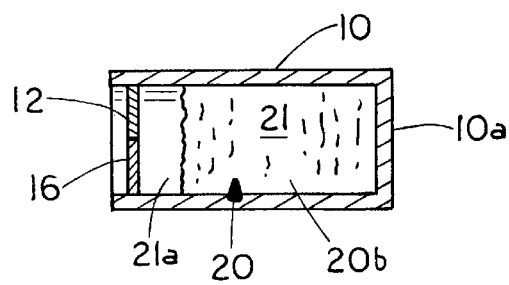
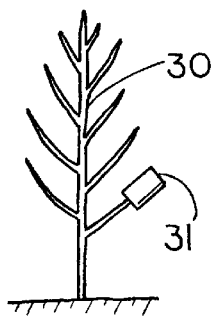
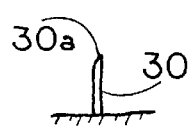
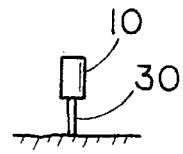
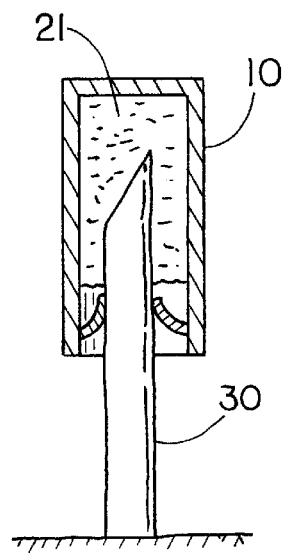

PLANT ATTACHMENT DEVICE FOR KILLING OBNOXIOUS PLANTS

This Appln claims the benefit of Provisional No. 60/114,845 filed Jan. 6, 1999.

FIELD OF THE INVENTION

This invention relates generally to plant control and more specifically to an apparatus and method for killing stubborn weeds, vines and small trees.

BACKGROUND OF THE INVENTION

The concept of chemical destruction of obnoxious weeds is well known in the art. Typically, a herbicide is sprayed on the leaves and stem of a weed to kill it. Oftentimes, weeds with deep roots require repeated applications of the herbicide before they die. This can lead to large expenditures for herbicides, as well as excessive herbicide that could be destructive to neighboring plants. In addition many herbicides require pre-application mixing procedures for activation or dilution. These procedures can increase the time necessary to effectively apply the herbicide, as well as creating a possible health hazard.

Another difficulty with traditionally applied herbicides is that rain can wash the herbicide off the leaves and stem of the plant before the herbicide can penetrate into and destroy the plant. Depending upon the type of herbicide, this could have damaging effects upon the surrounding plants. Further, many weeds are unfortunately perennial, and the use of traditional herbicides to control them may not prevent an annual appearance by the offending weed.

One of the most common methods of killing obnoxious weeds is to spray the leaves of the plant with a herbicide. In order to enhance the effectiveness of the herbicide and to prevent destruction of useful plants around the obnoxious weed one can place a shroud or some confinement member over the plant. Such an item is shown in the Dickison U.S. Pat. No. 2,841,923. Dickison uses a cup like member that is placed over the leaves of the plant so that the herbicide can be sprayed directly to the leaves of the plant and the environment around the plant.

The present invention provides an insitu herbicide carrier mechanism for those particularly stubborn weeds without the use of large cumbersome shrouds that envelope the leaves of the plant. The present invention can come ready-to-use so as to not require premixing and thus minimize contact between user and herbicide. In addition since the herbicide is not airborne one also minimizes chances of inhalation of the herbicide. With the present invention the herbicide is held in confinement for direct transfer to a cut stem of an obnoxious weed. The carrier mechanism, while delivering the herbicide to the plant, also provides a protective cover to prevent rain from washing the herbicide away from the plant.

The present invention is particularly useful for destroying perennial type weeds that require eradicating by killing the roots of the weed as the present invention maintains a supply of herbicide in direct contact with a weed stem for an extended period of time to allow the herbicide to penetrate into the roots of the weed and kill it.

BRIEF DESCRIPTION OF THE PRIOR ART

U.S. Pat. No. 2,841,923 discloses a spraying device with a cup shaped member that is placed over the plant before spraying the herbicide on the plant.

U.S. Pat. No. 3,899,100 displays a packing tube with at least one removable tube with the end cap having segments that deflect inward to insert objects therein.

U.S. Pat. No. 4,199,896 discloses a machine mounted boom sprayer that has a conical hood to limit the spray pattern.

U.S. Pat. No. 4,223,477 discloses a house plant sprayer shroud comprising a plastic bag to retain the insecticide proximate the plant.

U.S. Pat. No. 4,328,904 discloses a spill-proof container with flexible closures that flex inward to allow for insertion of articles therein.

U.S. Pat. No. 5,593,059 discloses a weather resistant newspaper delivery receptacle having a closure with end caps having flaps that fold inward to insert a newspaper or the like therein.

U.S. Pat. No. 5,676,990 discloses a method of food article dipping and wiping device wherein a set of flaps contact the article to remove excess condiment.

Great Britain patent 718,042 discloses

SUMMARY OF INVENTION

Briefly, the present invention comprises a plant attachment device including a herbicide carrier with a herbicide maintainable therein with the herbicide carrier having a penetrable cover to permit insertion of a cut stem of an obnoxious weed into the herbicide in the herbicide carrier where the herbicide can be allowed to penetrate though and into the plant stem and into the roots of the plant to kill the plant. The plant attachment device grips the plant stem to retain the herbicide carrier in place and also forms a protective cap over the cut weed stem to prevent rain from washing the herbicide away from the plant as well as to prevent the herbicide carrier from accidentally falling off the stem.

BRIEF DESCRIPTION OF THE DRAWINGS

FIG. 1 is a perspective view of the herbicide carrier of the present invention;

FIG. 2 is a cross-sectional view of the herbicide carrier of FIG. 1;

FIG. 3 is a side view showing the stem of an obnoxious weed being cut with a knife;

FIG. 4 is an elevated view of the cut stem of the weed shown in FIG. 3;

FIG. 5 shows the herbicide carrier of FIG. 1 located on the cut stem; and

FIG. 6 shows a sectional view of the herbicide located on the cut stem shown in FIG. 5.

DESCRIPTION OF THE PREFERRED EMBODIMENT

FIG. 1 shows herbicide carrier 10 comprising a cylindrical shell having a closed end 10a and a capped end 10b having a penetrable cover comprising a set of pie-shaped flaps 11, 12, 13, 14, 15, 16, 17, and 18 that extend toward a central point 40 of the carrier 10. The pie-shaped flaps are cantilevered radially inward from carrier 10 and are sufficiently resilient so as to maintain their extended postion during handling and shipping thereby inhibiting accidental herbicide disengorgement of the herbicide therein. The flaps have sufficiently flexible to allow the cut stem of a weed to penetrate through the flaps.

FIG. 2 shows a cross-sectional view of herbicide carrier 10 comprising a cup shaped rigid housing 35 having a closed end 10a and an open end covered with a set of resilient pie-shaped flaps 11–18 that cantilever out to a convergence point to form a closure over the end of the housing 35a. Housing 35a is preferable made from a rigid material such as a rigid polymer plastic so that the handling or application of the carrier to a plant stem does not result in the herbicide accidentally being squeezed out. However, other materials are within the scope of the present invention such as biodegradable materials that will disintegrate over an extended period of time which is longer than the time taken to kill the obnoxious weed An example of such a biodegradable material is a paper material. With a biodegradable carrier one need not retrieve the housing once the plant is dead.

Located within housing 10a is a chamber 20. A portion of chamber 20, which is identified by reference numeral 21a, is void of herbicide and a further portion of chamber 20, which is identified by reference numeral 20b, has a herbicide 21 located therein. In the embodiment shown, the herbicide 21 is suspended in a viscous medium to maintain the herbicide in a non flowing condition within the herbicide carrier 10. That is, the herbicide does not flow out of the herbicide carrier if the carrier is tipped upside down. The viscous medium can be any material that is sufficiently viscous as to be non flowing and is compatible with the herbicide. Typically, a suitable viscous material is silicone or the like. However, if the herbicide is itself in a viscous state one would need no viscous carrier. In the embodiment shown the herbicide is shown partially filling carrier 10, and is in a ready-to-use condition. That is chamber 21a provides an expansion chamber for the herbicide 21 to flow into as a weed stem is inserted into the herbicide carrier. Pie-shaped flaps 12 and 16 which form part of a penetrable cover that can retain the housing on a weed stem are shown in their normally fully closed position to prevent any of the herbicide 21 from escaping the carrier 10 during normal handling of the herbicide.

While the cover flaps 11–18 are shown performing the dual function of protecting the herbicide and engaging the plant, the plant engagement member need not be the cover but another member that engages the plant to hold the herbicide carrier in place. For example, a spike attached to housing 10 and located in the chamber 20 could project toward the open end so that the spike could be impaled on the cut end of the stem and thereby hold the herbicide carrier in kill postion on the obnoxious weed.

To illustrate the method of the invention reference should be made to FIG. 3, which shows a particular obnoxious weed 30 with the stem of the weed being cut by a garden tool 31 to produce a cut stem which is shown in FIG. 4. Weed 30 is the type of stubborn weed that cannot be destroyed by applying herbicide to the leaves, or is of the type that requires repeated applications of a herbicide in order to destroy the weed. Obnoxious weeds of this type can generally be destroyed with extended applications of herbicide to the plant stem which allows the herbicide to penetrate into the roots of the plant, which may be several feet in length. The stem illustrated in FIG. 4 has a fresh cut on the end thereof and is in a prime condition to absorb the herbicide therein. Once cut, one axially aligns the carrier 10 and the cut stem before inserting the stem though the flexible cover by forcing the carrier down onto the cut stem.

FIG. 5 shows the herbicide carrier 10 of the present invention located on the end of stem 30 with the closed end 10a of the herbicide carrier 10 facing upward and the pie shaped flaps engaging the stem 30. In order to place the housing 10a on the stem the user grasps the exterior of the housing 10a in his or her fingers and places the pie shaped flaps 11–18 proximate the weed stem and pushes the housing 10a downward. The resilient flaps flex inward to allow penetration of the weed stem and at the same time the resiliency of the flaps supports the herbicide carrier on the stem of the plant.

FIG. 6 shows a more detailed cross-sectional view of herbicide carrier 10 located on the cut stem of plant 30 with the herbicide 21 being held in proximity to cut stem 30 by the flaps 11–18 which are bent around the stem of the plant. With the flaps maintaining a supporting relationship to the herbicide carrier the herbicide carrier can continue to deliver herbicide 21 to the weed stem 30 so that the roots of the weed absorb the herbicide thus eventually killing the entire weed. As the flaps 11–18 maintain the herbicide carrier on the stem the herbicide 21 can be delivered to the stem under all weather conditions. That is if it should rain the herbicide carrier forms a rain cap to prevent water from contacting the cut end of the stem. In addition, the viscous medium can help maintain the herbicide in the carrier as well as maintain a path for the herbicide to penetrate into the roots of the weed and thus kill the weed.

The present invention is particularly useful with those type of weeds such as poison ivy which generally cause a rash when the person comes into contact with the plant Normally the cutting of a poison ivy plant is ineffective in killing the poison ivy. With the present invention one can cut the poison ivy plant using a tool so that the person does not come into direct contact with the irritating chemicals of the poison ivy. Once cut a person can insert the herbicide carrier onto the cut stem without having to come into direct contact with the plant. Consequently, the present invention provides an effective method for eliminating those hard to kill weeds which are also harmful to touch.

We claim:

1. A plant attachment device for chemically killing an individual plant comprising:

a herbicide carrier, said herbicide carrier including a housing having a chamber therein for encompassing a portion of a cut stem of a deeply rooted cut plant, said herbicide carrier having a first closed end and a second end;

a herbicide for killing a plant, said herbicide located in said chamber, said herbicide maintainable in said chamber;

a plant engagement member, said plant engagement member engaging the cut stem of the deeply rooted cut plant to maintain the herbicide carrier in position thereon to enable the herbicide to penetrate and kill the cut plant.

2. The plant attachment device of claim 1 wherein the plant engagement member comprises a cover.

3. The plant attachment device of claim 2 wherein the cover comprises a plurality of resilient members that are cantileverly mounted on the housing and flex inward around the cut plant stem.

4. The plant attachment device of claim 1 wherein the housing comprises a polymer plastic.

5. The plant attachment device of claim 2 wherein the housing comprises a biodegradable material.

6. The plant attachment device of claim 2 wherein the cover comprises at least six flexible segments.

7. The plant attachment device of claim 1 wherein the housing is rigid to prevent accidental disengorgement of herbicide therefrom.

8. The plant attachment device of claim 1 wherein the chamber includes a first portion of a chamber free of the herbicide and a second portion of the chamber with the herbicide therein with the first portion of the chamber free of the herbicide forming a reservoir to accommodate displacement of herbicide in the herbicide carrier as a cut plant stem is inserted therein.

9. The plant attachment device of claim 1 wherein the herbicide is carried in a viscous non-flowable medium.

10. The plant attachment device of claim 1 wherein the second end of the carrier is completely closed by a penetrable cover.

11. The method of killing an obnoxious weed comprising the steps of:

cutting a stem of an obnoxious weed slightly above ground level to leave a cut weed stem with an exposed face;

inserting the end of the cut weed stem into a housing having a penetrable cover so that the penetrable cover can engage and hold the housing in a capped postion to thereby enable a herbicide in the herbicide carrier to penetrate into a root system of the cut weed stem.

12. The method of claim 11 including the step of cutting the stem at an angle to increase the surface area of the exposed face for coming into contact with the herbicide.

13. The method of claim 12 including flexing the cover of the carrier with the cut stem by axially aligning the carrier and the cut stem before inserting the stem though the flexible cover.

* * * * *